Aug. 3, 1937.  J. H. CONNOR ET AL  2,088,578
PUTTING-OUT MACHINE
Filed Aug. 30, 1935  4 Sheets-Sheet 3
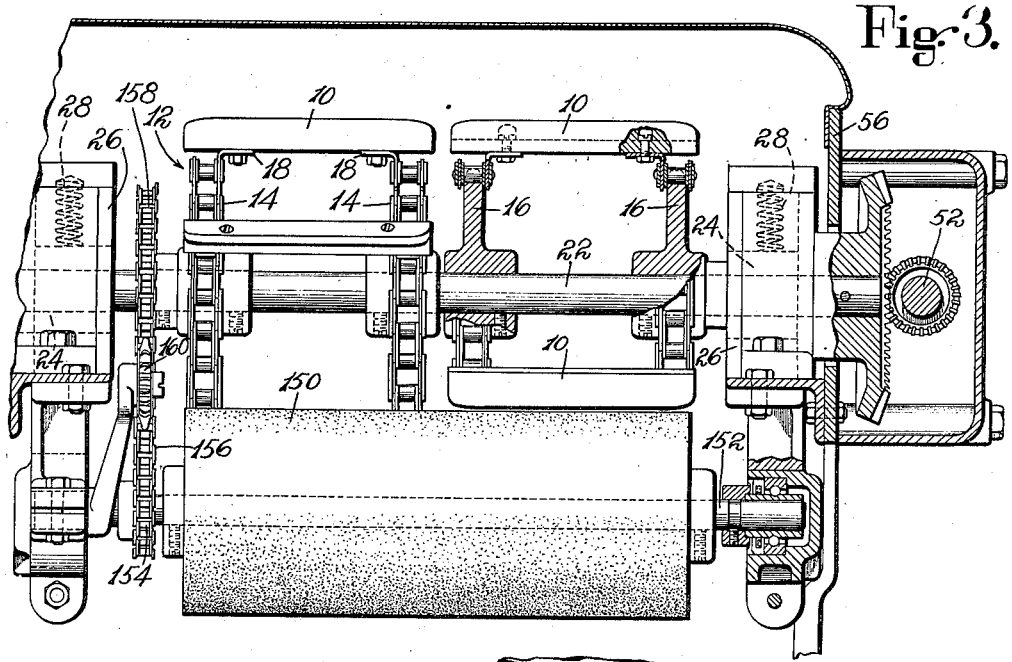
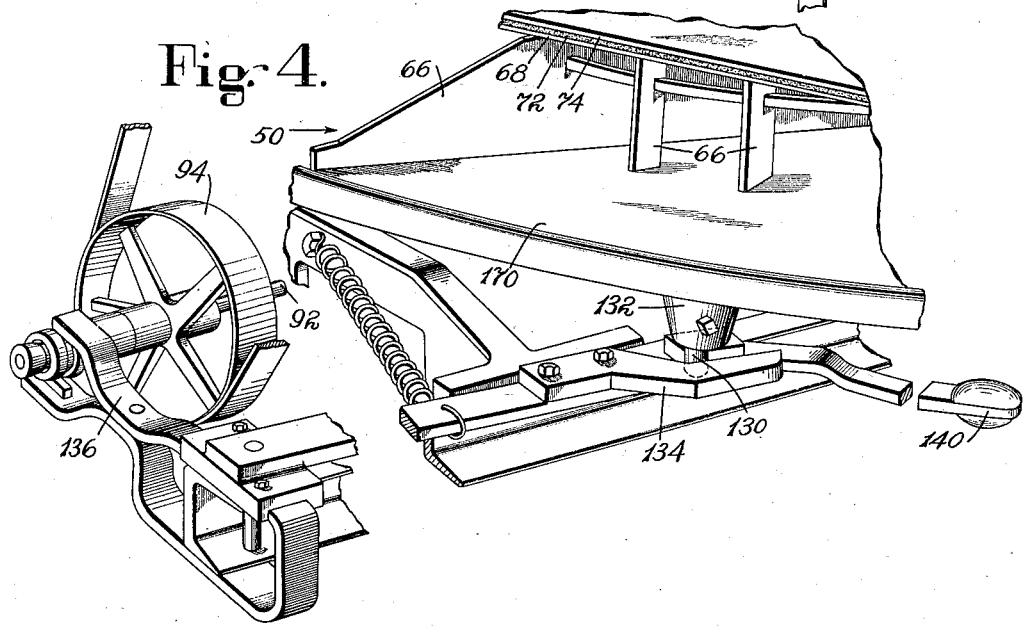

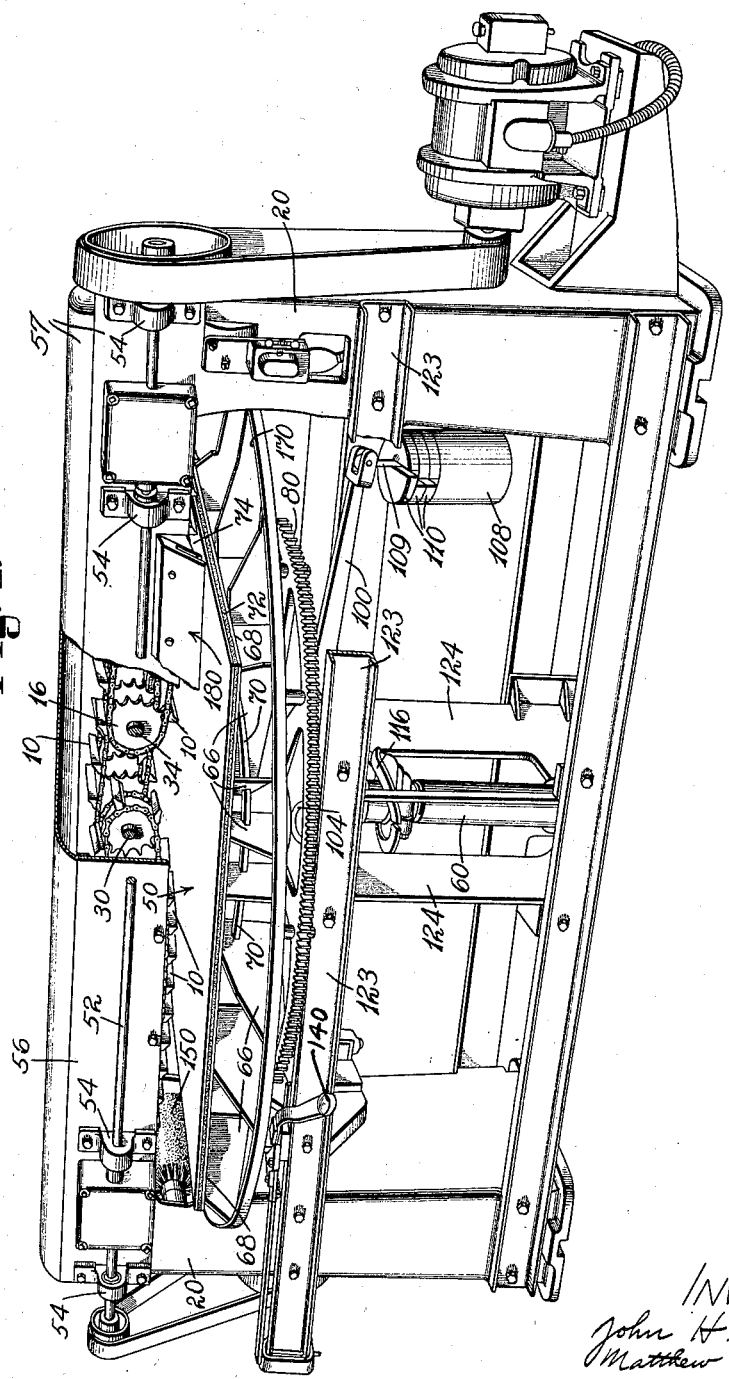

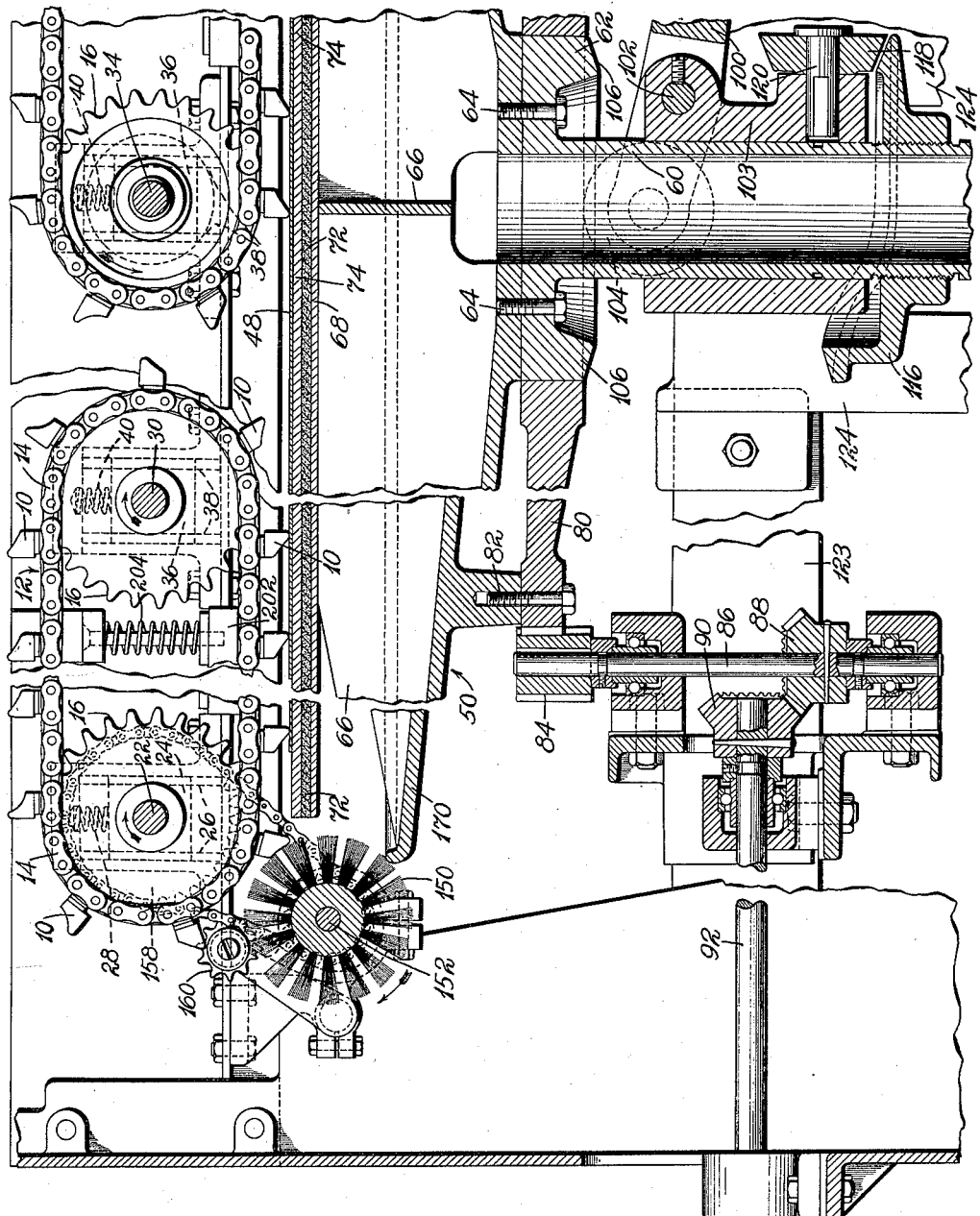

Aug. 3, 1937.  J. H. CONNOR ET AL  2,088,578
PUTTING-OUT MACHINE
Filed Aug. 30, 1935  4 Sheets-Sheet 4
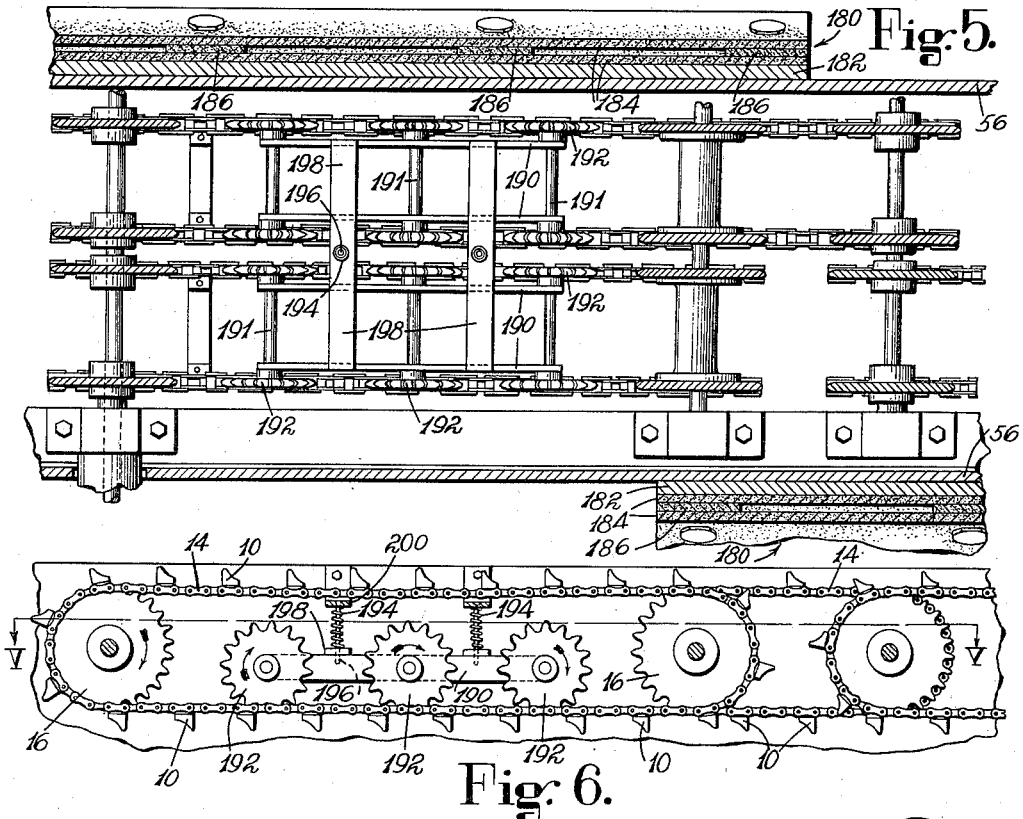
Fig. 5.
Fig. 6.
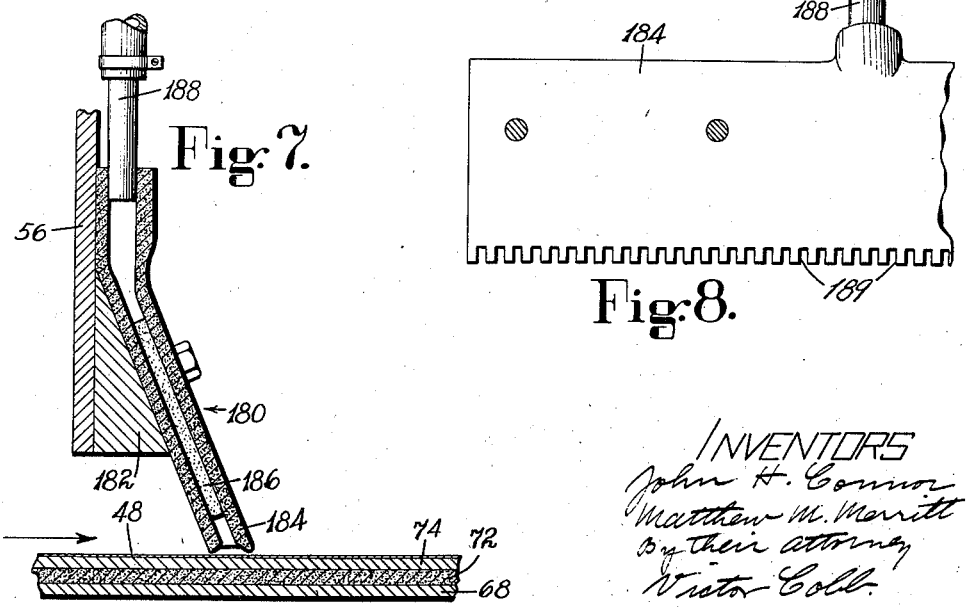
Fig. 7.
Fig. 8.
INVENTORS
John H. Connor
Matthew M. Merritt
By their attorney
Victor Coll Patented Aug. 3, 1937

2,088,578

UNITED STATES PATENT OFFICE 2,088,578

PUTTING-OUT MACHINE

John H. Connor, Newton, and Matthew M. Merritt, Middleton, Mass., assignors to The Tanning Process Company, Boston, Mass., a corporation of Massachusetts Application August 30, 1935, Serial No. 38,586

15 Claims. (Cl. 149—20)

This invention relates to machines for operating upon hides, skins, and leather. While the invention is illustrated as embodied in a machine for performing putting-out operations upon hides and skins, it will be understood that the invention and various important features thereof may have other applications and uses.

While in its broader aspects the invention is directed to novel means for presenting pieces of work to tools adapted to treating hides, skins, and leather, there are features of construction in both tools and work presenting means which are specially useful in machines for performing putting-out operations on hides and skins and removing liquid materials therefrom.

It is an object of the invention to provide an improved machine for putting out hides and skins and simultaneously therewith removing liquid material from said hides and skins in a highly efficient manner. It is a further object of this invention to facilitate treatment of pieces of work, including, for example, those pieces which are preliminarily spread out upon individually portable work supports, by providing for ready introduction and removal of work pieces, and of work supports which carry work pieces, into and from a machine during treatment of successive pieces of work. A further object of the invention is to dispose of waste material from the pieces of work in such manner as to leave the work supports and the operating tools in a clean condition, and to do this without attention or effort on the part of the operator. A still further object is to provide for uniformly high quality in the product obtained as a result of the machine's operations.

To these ends and in accordance with an important feature of the invention, the illustrated machine, which constitutes a preferred embodiment of the invention, is provided with means for causing at intervals relative approaching and separating movements of a work support and of a tool or tools provided for treatment of hides and skins, the separating movement taking place at a predetermined point in a relative rotative movement between the work support and the tool or tools by which the latter are caused to treat all portions of a given work piece. In this way the machine is periodically conditioned to facilitate the substitution of a fresh piece of work for that which has received treatment by said tool or tools. Conveniently and as shown, the work support is yieldingly moved in an upward direction to present each piece of work in turn to the work treating means and is held with the work piece pressed yieldingly against the work treating means during rotation of the work support through a predetermined distance such that all portions of the work receive treatment. In the illustrated construction, means is provided for depressing the work support so related to the means for rotating the work support that the former means becomes operative at a predetermined point in the rotation of the work support.

It is an important feature of the invention that suction means, including a suction nozzle, is provided for the purpose of removing liquid material from the surface of the work piece, and preferably also from the surface of the work support, during relative rotary movement of the suction nozzle and the work support during which successive portions of the work and of the work support are passed by the end of the suction nozzle. Preferably and as shown, the suction nozzle is made flexible so as to minimize the likelihood of disturbing the pieces of work which, in a preferred arrangement, have been spread out upon the work support by blade members designed for that purpose and operative at the same time to express liquid material from the work pieces.

Another feature of the invention relates to the provision of means for removing waste material from the blades or other tools which are operative to express said waste material from the hides or skins undergoing treatment. In a preferred construction, improved means is also provided, in association with the work support, for collecting waste material expressed from the hides or skins and discharging it from the machine.

These and other important features of the invention and novel combinations of parts will now be described in detail in the specification and then pointed out more particularly in the appended claims.

In the drawings,

Fig. 1 is a perspective view of a putting-out machine illustrating one embodiment of the invention;

Fig. 2 is a sectional view showing details of the work-treating and work-supporting mechanisms;

Fig. 3 is a detail view taken at a right angle to the view in Fig. 2 and showing details of the driving means for the tools and for one of the brushes;

Fig. 4 is a detail of the means for initiating rotation of the work support;

Fig. 5 is a detail of conveyors for carrying and operating putting-out tools, the view being taken along line V—V of Fig. 6;

Fig. 6 is a view in side elevation of the conveyor mechanism shown in Fig. 5;

Fig. 7 is a sectional view of a suction nozzle for taking up moisture from the work pieces; and Fig. 8 is a view of the suction nozzle looking in the direction of the arrow in Fig. 7.

In the illustrated machine, which is designed particularly for putting-out or slicking operations upon hides and skins, there is provided a plurality of tools in the form of blades 10, these blades being carried by endless conveyors 12 (Fig. 2) each comprising a pair of chains 14 (Fig. 3) passing over sprocket wheels 16. As shown most clearly in Fig. 3 of the drawings, the blades 10 extend transversely of their supporting chains 14, certain of the links of which are provided with angle irons 18 rigidly secured to individual links directly in line with each other in the two chains, and horizontal portions of the angle irons 18 being bolted to the blades 10. As most clearly indicated in Figs. 2 and 3 of the drawings, the sprocket wheels 16 adjacent to the end posts 20 of the machine frame are carried by a single shaft 22 journaled at its ends in bearing boxes 24. Preferably and as shown, the bearing boxes 24 are mounted slidably in vertical guideways 26 and are pressed in a downward direction by suitable springs 28, the purpose being to permit yielding of the blades 10 in an upward direction to accommodate variations in the thickness of the work undergoing treatment. At the inner ends of the conveyor chains 14, there are sprocket wheels 16 mounted upon shafts 30 and 34, the shaft 30 being mounted at its ends in boxes 36 guided for vertical movement in guideways 38 and pressed upon by springs 40. The shaft 34 is similarly mounted and similarly provided with spring means, all arranged to permit upward yielding movement of the blades in engagement with a piece of work 48 on a work support 50. Conveniently and as shown, the shafts 22, 30 and 34 are all driven from a single shaft 52 (Fig. 1) extending longitudinally over the top of the work support 50 and supported in bearings 54 carried by a wall 56 of an inverted trough shaped frame member 57 supported at the upper ends of the end frames or posts 20, and arranged to enclose the bladed belts or conveyors.

The arrangement of the inner ends of the conveyor belts together with their supporting shafts 30 and 34 by which the spacing between the inner ends of one pair of conveyor belts is staggered with respect to the space between the other pair of conveyor belts is not claimed herein since it forms part of the subject-matter of United States Letters Patent No. 2,035,461, granted March 31, 1936, on an application filed in the name of J. H. Connor.

For supporting the work while it is undergoing treatment there is provided, as stated above, a work supporting table 50, which in the illustrated construction is secured to the upper end of a post 60, the latter being made hollow to serve as a conduit as will hereinafter be described. Upon referring to Fig. 2 of the drawings, it will be observed that the post 60 is provided with a flange 62 to which the work supporting table 50 is bolted by bolts such as those shown at 64. As indicated most clearly in Figs. 1, 2 and 4, the work supporting table 50 comprises vertically positioned web members 66 which at their upper edges support a flat horizontal table member 68, which as shown is sheet metal, the web members 66 being connected by an annular member 70 which serves to maintain the web members in vertical position and thus strengthen the support for the flat table member 68. On the flat metal table member 68 there is provided a sponge rubber mat 72 which is substantially coextensive with the table member and is cemented thereto although it may be otherwise secured to the table member. The purpose of the rubber mat 72 is to provide a frictional surface which will minimize the changes of displacement of a board 74 which is a portable work support upon which a piece of work such as a hide or skin will be supported during treatment of such hide or skin by the blades 10. The rubber mat 72 has a further function of acting somewhat as a buffer or yielding member, so that as the work supporting table rises to present the work to the blades 10 there will be presented a surface back of the work which is not completely unyielding. However, as indicated above, the blades 10 are yieldingly pressed in a downward direction by suitable spring means hereinafter more fully described, so that there is obviated any possibility of injury to the work during initial engagement thereof and also subsequently during treatment of the work by said blades.

While the blades 10 are moving in sets away from each other and also away from a median portion of the work outwardly toward marginal portions thereof, the work support 50 is continuously rotated, the arrangement being such the the table is given nearly a complete revolution while the blades are in contact with the work, whereby all portions of the piece of work will receive treatment before the work support moves to a depressed or work receiving position.

Preferably and as shown, power means is provided for rotating the work supporting table 50, the said means comprising a relatively large gear wheel 80 (Figs. 1 and 2) securely fastened as by bolts 82 to the table 50. Arranged in mesh with the teeth of the large gear 80, is a pinion 84 having elongated teeth so that the gear 80 and the pinion 84 remain in mesh notwithstanding upward and downward movement of the gear 84 with the table 50. The pinion 84 is carried by a vertical shaft 86 mounted in suitable bearings in the machine frame and having secured thereto a bevel pinion 88 arranged to be in mesh with a bevel pinion 90 fastened to a horizontal shaft 92 mounted in suitable bearings and having rotatably mounted thereon a pulley 94 which may be clutched and unclutched from the shaft 92 as will hereafter be described.

Means is provided, in the illustrated construction, for holding the work supporting table 50 yieldingly in its upper or work presenting relation with respect to the blades 10. As shown, said means comprises a lever 100 (Figs. 1 and 2) pivoted at 102 on a frame member 103 of the machine and having a forked portion each arm of which carries a roll 104 maintained in rolling contact with an annular surface 106 on the flange member 62 of the post 60. For holding the rolls 104 in contact with the annular surface 106, there is provided a weight member 108 pivotally carried at the outer end of the lever 100 by a rod 109 so that individual weights 110 may be selectively strung on the rod 109 above the member 108 to add to or subtract from the pressure at which the work support 50 presents its pieces of work to the blades 10.

Since the weight member 108 is constantly acting to move the work support 50 in an upward direction, means must be provided to move the work support 50 in a downward direction to a position where work may be introduced and removed. This means comprises, in the illustrated construction, a face cam 116 (Figs. 1 and 2) adjustably secured to the post 60. While the cam 116 is secured to the post by being threaded thereon, it may obviously be secured in any other well-known way. For co-operating with the cam 116, there is provided a cam roll 118 rotatably mounted on a stud 120, the latter being supported by the fixed member 103 which is rigid with a tie bar 123 and with one of two standards 124 forming part of the machine frame. It will be clear that, during rotation of the post 60, the high part of the cam 116 will at times be under the roll 118 in which case the cam 116 and the post 60 will be in the lowered position shown in Fig. 1 of the drawings. Upon further rotation of the post 60, the lower part of the cam 116 will be presented beneath the roll 118 during which the post 60 and work supporting table 50 will be in the elevated position shown in Fig. 2, the post and the table being moved upwardly and maintained in operative position by the weight member 108 at the end of lever 100. It will be clear from an inspection of Figs. 1 and 2, that the cam 116 has the greater part of its circumference so arranged that the work support 50 will be in its upper work presenting relation to the blades 10 during most of the rotation of the table. The rest of the cam surface 116 is so constructed that the table is gradually moved downwardly and reaches its most depressed position at the high point of the cam 116, this depressed position being for the purpose of facilitating removal of the piece of work just treated and the introduction of a fresh piece of work.

Means is preferably provided to automatically terminate rotation of the table at the instant it reaches its most depressed position, the said means comprising in the illustrated construction a stop member 130 (Fig. 4) which is vertically adjustable in a boss 132 carried by the lower surface of the work supporting table 50 in a predetermined relation to the high part of the cam 116 on the work support post 60, the arrangement being such that the stop member 130 contacts a cam surface on a clutch lever 134 to shift a clutch operating member 136 whereby the pulley 94 is disconnected from the shaft 92 (Fig. 2) so that the work support 50 comes to rest at its depressed work receiving position. Preferably and as shown the clutch lever 134 has a handle member 140 so that said clutch lever may be operated manually to stop rotation of the work support at any point desired by the operator. In this connection it should be stated that the lever 134 is relatively long and flexible and that it may be readily "sprung" downwardly to disengage it from the stop pin 130, and when in such downward position it may be moved away from the operator to start the machine in operation.

As shown, means is provided for sweeping liquid waste material from each blade in turn as it leaves the table member following its operation on the work piece. The said means comprises a rotary brush 150 (Figs. 1, 2 and 3) mounted on a shaft 152 carried by suitable bearings in the frame of the machine, said shaft 152 having secured thereto at one end a sprocket wheel 154 (Fig. 3) about which passes a chain 156 that also passes around a sprocket wheel 158 on the shaft 22 which carries sprockets 16 of the bladed conveyors 12. Preferably and as shown, the brush 150 is adjustable so as to be readily positioned with respect to the blades 10, a small idler sprocket 160 being provided to press on the sprocket chain, whereby proper tension of the driving chain 156 is maintained in spite of the adjustments of the brush 150.

Liquid waste material, removed from the work pieces during treatment thereof by the blades 10, runs from the upper surface of the work support 50, and drops into a trough member 170 which forms part of the work support 50, the trough member 170 being so shaped as to direct the liquid waste material to a central point thereof where it is conducted down through the hollow post 60 which serves as a conduit to carry the waste material to a pipe (not shown) leading to a drain, the lower end of the hollow post 60 being positioned above the upper expanded end of said drain pipe, not shown.

While a piece of work, such as that shown at 48 (Fig. 2) on the portable work support or board 74, is being operated upon by the blades 10, liquid is being removed from the piece of work, oftentimes in considerable quantities, but the blades do not remove any liquid deposited on the upper surface of the board 74 for the reason that they do not come in contact with the board 74 beyond the edges of the piece of work. Hence, means is provided which will assist in removing liquid from the piece of work and which will also remove liquid from the upper surface of the drying board beyond the margin of the work piece. As shown in Fig. 7, this means comprises an air suction device 180 secured by a bracket 182 to the outside of the wall 56 of the trough-shaped member 57 which encloses the traveling bladed belts. Two of these devices 180 are secured to the member 57 in the positions disclosed in Fig. 5, the arrangement and construction of the devices being such that their inner ends overlap thus ensuring that water will be removed by these suction devices over all portions of the work pieces 48 and the boards 74 which carry said work pieces during one complete rotation of the table 50. Referring again to Figs. 5 and 7, it will be observed that each suction device comprises a two-walled nozzle 184 which has its long dimension extending along said wall 56. The nozzle is made of any suitable flexible material such as rubber reinforced only to such extent that it will not collapse under the desired air pressure. For example, flexible ribs 186 may be arranged within each nozzle between the walls thereof and extending transversely of the long dimension of such nozzle. The lower ends of the nozzles rest lightly on the work pieces so as not to disturb the latter, particularly since the nozzles are so located as not to contact the work pieces until they have been slicked down on the portable work supports 74. It is to be noticed, furthermore, that the nozzle is disposed at a considerable inclination to the surface of the work (Fig. 7) and that the slicked-out work, traveling in the direction of the arrow, will not be likely to be disturbed by the flexible nozzle 184. Extending up from each nozzle 184 is a tube 188 which is connected to an air pump or other suction means (not shown). Preferably the face of the nozzle against which liquid material may be carried in the movement of the work will be notched or provided with narrow slits 189, as indicated in Fig. 8, to facilitate entrance of both liquid and air into the nozzle 184.

While the work support 50 is yieldingly pressed in an upward direction by the weighted lever 100

(Fig. 1), whereby the work piece 48 is pressed yieldingly against the blades 10, it will be readily understood that the inertia of the work support 50 and of the weighted lever is so great that this arrangement of itself would not provide for relative movement of a blade and of the work support relatively to each other to accommodate variations in thickness of the work. Hence, means is provided as above described for yieldingly mounting the shafts which support and operate the blade carriers. In addition it is preferred to provide a yielding backing for the lower run of the flexible carrier chains 14 so that the blades on said lower run of the carrier may yield upwardly to become adjusted to variations in the thickness of the work. In the illustrated construction, the said yielding means is found in a frame member 190 (Figs. 5 and 6) located between the sprocket wheels 16 of the chain carrier and between the upper and lower runs of the flexible chain carrier, the said frame 190 carrying shafts 191 and idler sprocket wheels 192 mounted thereon. As shown, the frame itself is backed by springs 194 guided by rods 196 arranged centrally of the frame 190 between cross bars 198 on the frame 190 and other cross bars 200 rigidly supported by the side bars 56 of the machine frame. It will be readily understood that the blades 10 may yield upwardly to accommodate variations in the thickness dimensions of the work. Furthermore, any well-known means may be provided for varying the tension of the springs 194. In place of the frame 190 with its idler sprockets 192 there may be provided, as a yielding backing means, a runner 202 in the form of a strip of metal extending along over each lower run of the chains 14 and backed by springs 204, all as shown in Fig. 2 of the drawings. However, the frame construction 190 is preferred since the pressure on all parts of the lower runs of the chain carriers is more likely to be uniformly distributed by its use.

In operating the illustrated machine a piece of work, such as a skin 48, is placed upon a portable work support or board 74 and then the latter is slid in place upon the rubber mat 72 which forms the upper surface of the work support table member 68. Upon starting the machine in operation, the table 50 moves upwardly until the work is brought into contact with the traveling blades 10 which are operated in sets moving in opposite directions to put out the skin and remove liquid therefrom, it being understood that the blades 10 are constantly moving in their predetermined paths. Since the table member 68 forming part of the table 50 is rotated continuously in one direction while it is in work presenting relation to the blades 10, the latter are caused to treat all portions of the work during a certain predetermined amount of rotation of the table while the latter is in work presenting position. Subsequently, the table is depressed through operation of the cam member 116 in co-operation with the cam roll 118 in such manner that the table moves to open or work receiving position at which time the table comes to rest. While in this position, the treated work may be removed and a fresh piece substituted therefor.

Having described our invention, what we claim as new and desire to secure by Letters Patent of the United States is:

1. In a machine for operating upon hides, skins, and leather, a work supporting member, a plurality of tools, a member arranged to support and move said tools over a piece of work on the work supporting member, means holding the work supporting member in the direction of the tools during operation of the latter on the work pieces, means to cause relative rotation of the work and tool supporting members, and means to cause relative separating movement of the work supporting member and the tools into work receiving position at a predetermined point in the relative rotation of said members.

2. In a machine for operating upon hides, skins, and leather, a plurality of tools, a member arranged to support and operate said tools, a table adapted to support a piece of work against the thrust of said tools, means for rotating the table, means holding the table in a direction toward said tools, means to move the table away from the tools and into work receiving position, and a member mounted on the table and operative to initiate termination of the rotary movement of the table at a predetermined point in the movement of the table to work receiving position.

3. In a machine for operating upon hides, skins, and leather, work treating blades, a member arranged to support and operate said blades, a table adapted to support a piece of work against the thrust of said blades, means for rotating the table, means operative to hold the table yieldingly in a direction toward said blades, means to move the table away from the blades, a clutch arranged to actuate the last-mentioned means, a manually operable member to control said clutch, and a member mounted on the rotary table to operate the manually operable member at a predetermined point in the rotation of the table.

4. In a machine for operating upon hides, skins, and leather, a bladed member adapted to operate upon a piece of work to spread out the leather and remove liquid material therefrom, a table to support a piece of work while it is being operated upon by the bladed member, a post arranged to support the table, means to hold the table yieldingly in the direction of said bladed member during operation of the latter on the work, means to rotate the table and to operate on said post to depress the table into inoperative or work receiving position, and a member carried by the table to terminate operation of said table rotating means.

5. In a machine for operating upon hides, skins, and leather, a bladed member adapted to operate upon a piece of work to spread out the leather and remove liquid material therefrom, a table to support a piece of work while it is being operated upon by the bladed member, means to rotate the table during operation of the bladed member on the work, a post arranged to support the table, means to hold the table yieldingly in the direction of said bladed member during operation of the latter on the work, and means comprising a cam and cam roll, one of which is mounted on said post and operative during rotation of the table to effect movement of the table to its lower work receiving position.

6. In a machine for operating upon hides, skins, and leather, a bladed member adapted to operate upon a piece of work to spread out the leather and remove liquid material therefrom, a table to support a piece of work while it is being operated upon by the bladed member, said table having an upper work supporting portion and a lower portion shaped as a trough to receive waste liquid material removed from the work pieces, and a post arranged to support the table, said post being hollow to serve as a conduit in the discharge of the waste material from said table.

7. In a machine for operating upon hides, skins, and leather, a bladed member adapted to operate upon a piece of work to spread out the leather and remove liquid material therefrom, a table to support a piece of work while it is being operated upon by the bladed member, said table having an upper work supporting portion and a lower portion shaped as a trough to receive waste liquid material removed from the work pieces, a post arranged to support the table, said post being hollow to serve as a conduit in the discharge of the waste material from said table, means to hold the table yieldingly in the direction of said bladed member during operation of the latter on the work, a cam roll mounted on a stationary part of the machine frame, and a cam mounted on the post and operative during rotation of the latter to depress the table to its lower work receiving position.

8. In a machine for operating upon hides, skins and leather, a member having a plurality of blades for operating upon a piece of work to remove liquid material therefrom, a work supporting table upon which a piece of work may be placed for treatment by the blades of the bladed member, said table comprising a work supporting surface in a substantially horizontal plane and also a lower member in the form of a trough to receive liquid material removed from the piece of work on the upper work supporting surface, and means for removing liquid material from the blades in succession as each in turn passes away from the work piece on said work supporting surface.

9. In a machine for operating upon hides, skins and leather, a member having a plurality of blades for operating upon a piece of work to remove liquid material therefrom, a work supporting table upon which a piece of work may be placed for treatment by the blades of the bladed member, said table comprising a work supporting surface in a substantially horizontal plane and also a lower member in the form of a trough to receive liquid material removed from the piece of work on the upper work supporting surface, and a brush positioned adjacent to the edge of the work supporting surface and operative to remove liquid material from each blade in turn as it moves away from the work to the edge of the work supporting surface, said brush being positioned to deliver the waste material to said trough.

10. In a machine for performing putting-out operations on hides and skins, a traveling work support, a plurality of blades arranged to express liquid from pieces of work on said work support, a support for said blades, and a suction nozzle carried by said support to assist in removing liquid expressed from the hide or skin by said blades, said suction nozzle and blades being operative to remove liquid from the work pieces during relative movement between the work pieces and said nozzle and blades.

11. In a machine for performing putting-out operations on hides and skins, a traveling work support, a plurality of blades arranged to express liquid from pieces of work on said work support, a support for said blades, and means comprising a suction nozzle member carried by said support and operative to assist in removing liquid expressed from the pieces of work by said blades, said suction nozzle member being flexible and adaptable to project beyond the plane of the operative edges of said blades.

12. In a machine for performing putting-out operations on hides and skins, a rotary work support, a plurality of blades arranged to express liquid from pieces of work on said work support, a support for said blades, and suction nozzle members mounted on said support and extending lengthwise thereof in overlapping relation to each other to operate on all portions of the work during rotation of the table to assist in removing liquid expressed from the pieces of work by said blades.

13. In a machine for performing putting-out operations on hides and skins, a movable work support, a plurality of blades arranged to express liquid from pieces of work on said work support during movement of the latter, and suction means including a flexible nozzle mounted on a stationary part of the machine frame and operative to assist in removing liquid expressed from the hide or skin by said blades, said suction nozzle being mounted at a substantial inclination to the surface of the work pieces on said work support, and the direction of the inclination being such that the moving work tends to lift the flexible end of the suction nozzle.

14. In a machine for operating upon hides, skins, and leather, a work support, suction means including a suction nozzle of flexible material having its open end in closely spaced parallel relation to the exposed surface of a work piece on the work support, a support to hold the suction nozzle in position above the work on said work support, and means to cause relative movement between the suction nozzle and the work support whereby liquid material on the surface of a hide or skin may be removed during the described relative movement.

15. In a machine for operating upon hides, skins, and leather, a rotary work support, suction means including a suction nozzle having its open end in closely spaced parallel relation to the exposed surface of a work piece on the work support, said nozzle having notches in that portion of its wall against which liquid on the work piece will tend to collect during relative movement between work piece and nozzle, a support for said suction nozzle, and means to rotate the work support to present successive portions of the work to said suction nozzle whereby liquid material on the surface of a hide or skin may be removed by said suction means.

JOHN H. CONNOR.
MATTHEW M. MERRITT.

JOHN H. CONNOR.
MATTHEW M. MERRITT.